Sept. 9, 1969        G. O. REED        3,466,071
STRUCTURAL BRACE
Filed Jan. 8, 1968
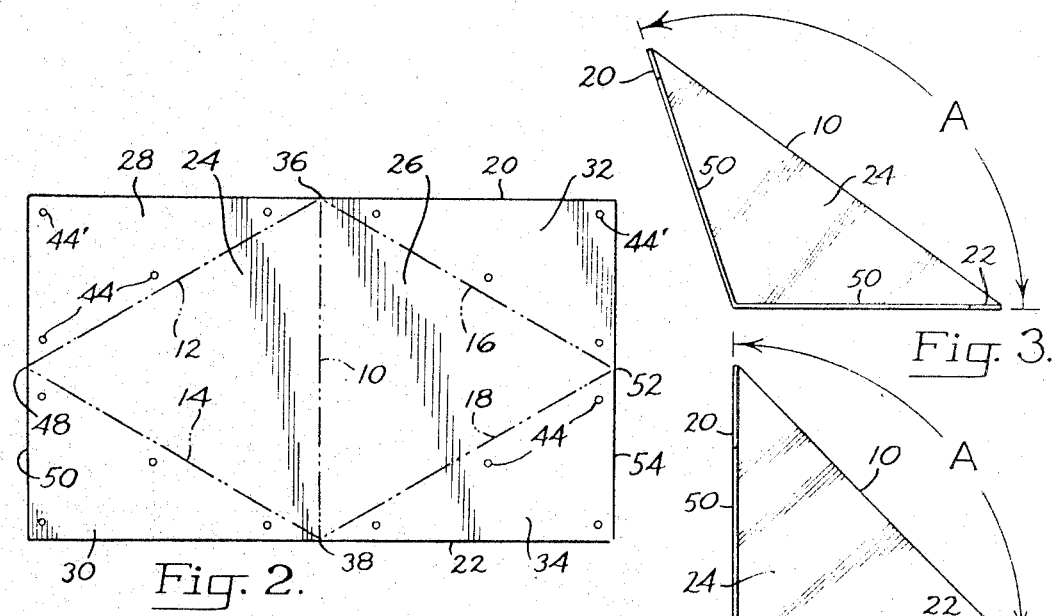
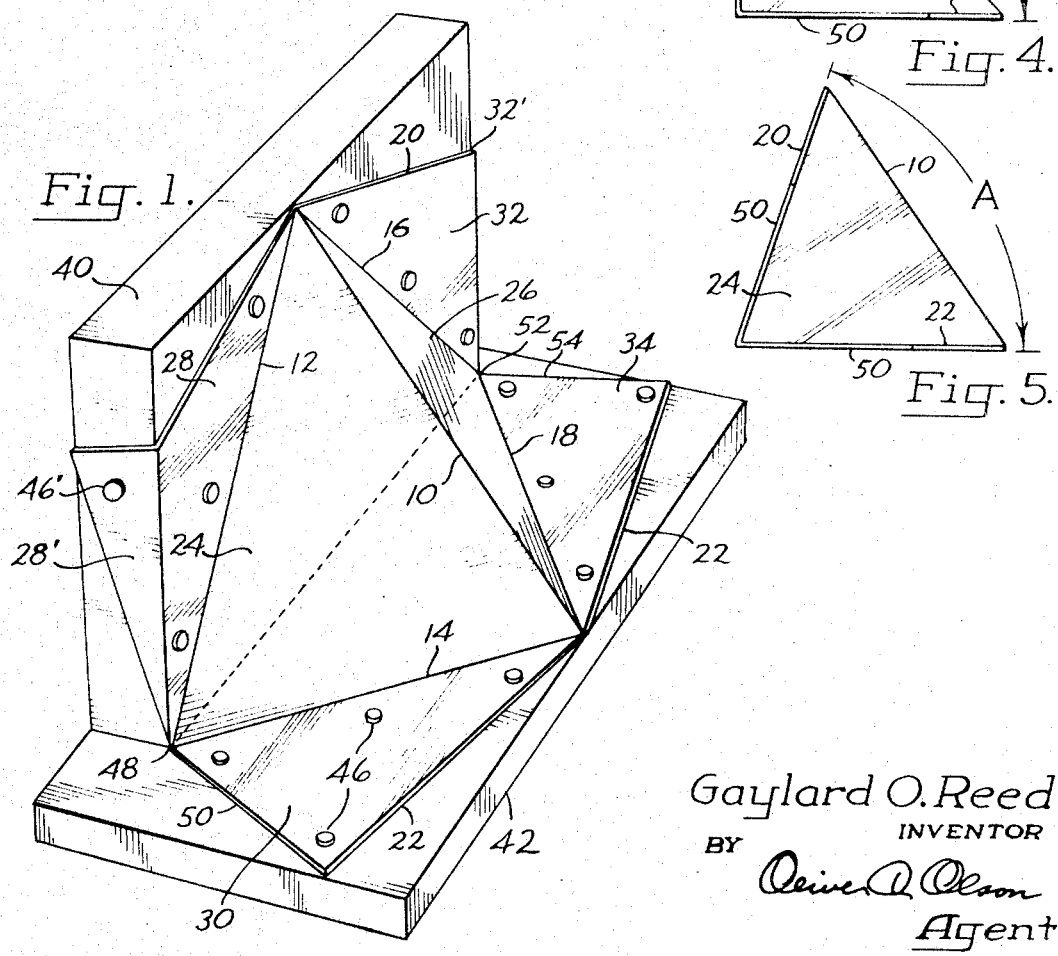
Gaylard O. Reed
INVENTOR
BY Oliver A. Olson
Agent United States Patent Office 3,466,071
Patented Sept. 9, 1969

3,466,071
STRUCTURAL BRACE
Gaylard O. Reed, 8636 SW. 14th Ave.,
Portland, Oreg. 97219
Filed Jan. 8, 1968, Ser. No. 696,463
Int. Cl. F16l 5/00, 9/00; E04c 3/00
U.S. Cl. 287—20.92                                2 Claims

ABSTRACT OF THE DISCLOSURE

A single structural plate is bent angularly inward along an intermediate line to form angularly offset lateral portions defining between their inner surfaces an included angle of less than 180°. Each lateral portion has a pair of anchor tabs extending angularly outward therefrom, the planes of intersection of the inner surfaces of the pair of anchor tabs defining an included angle of less than 180° corresponding to the angle between a pair of structural members to be braced by the plate.

Background of the invention

This invention relates to structural braces, and more particularly to a novel and extremely simplified one-piece structural brace for joining a pair of structural members defining between them an included angle of less than 180°.

Structural braces of the class described provided heretofore are characterized disadvantageously by complex and costly construction involving a plurality of parts and a plurality of production steps, including the formation of the individual parts and the welding or otherwise joining of the parts together as an integral unit.

Summary of the invention

In its basic concept, the structural brace of the present invention is produced from a single plate of structural material which, in a single operation, is bent along predetermined lines to form angularly offset lateral portions and integral anchor tabs on each lateral portion disposed angularly outward to correspond to the angle between a pair of structural members to be braced.

It is by virtue of the foregoing basic concept that the principal objective of the present invention is achieved, namely to overcome the disadvantages of prior structural braces, as enumerated hereinbefore.

Another important object of this invention is the provision of a structural brace produced by the one-step bending of a single plate of structural material along predetermined lines and to various predetermined angles, for bracing structural members disposed of various angles to each other.

Another important object of the present invention is to provide a one-piece structural base capable of being produced in various sizes and strengths for a wide variety of uses.

The foregoing and other objects and advantages of the present invention will appear from the following detailed description, taken in connection with the accompanying drawing of the preferred embodiment.

Brief description of the drawing

FIG. 1 is a perspective view showing a pair of structural members joined together by a structural brace embodying the features of this invention.

FIG. 2 is a plan view of a single plate of structural material showing in dot-and-dash lines the lines along which the plate is bent to form the structural brace illustrated in FIG. 1.

FIGS. 3, 4 and 5 are end elevations illustrating brace constructions which provide for joining structural members defining between them included angles greater than, equal to and less than 90°, respectively.

Description of the preferred embodiment

In accordance with the present invention the structural brace illustrated is formed from a single flat plate of structural material, preferably by the simultaneous bending of the plate along the dot-and-dash lines 10, 12, 14, 16 and 18 illustrated in FIG. 2, as follows:

Bending of the plate inwardly along the intermediate line 10 which extends between the end edges 20 and 22 of the plate, forms angularly offset lateral portions 24 and 26 which define between their inner surfaces an included angle of less than 180°. These angularly offset lateral portions form a rigid brace section capable of withstanding substantial stress. The degree of strength is determined in part by the type and of thickness of material employed and in part by the magnitude of the included angle.

By bending the plate angularly outward along the lines 12, 14 and 16, 18 each lateral portion is provided with a pair of anchor tabs, the pair of tabs 28 and 30 being associated with the lateral portion 24 and the pair of tabs 32 and 34 being associated with the lateral portion 26. The tabs of each pair are disposed such that the planes of intersection of their inner surfaces define an included angle A of less than 180°, which angle corresponds to the angle between a pair of structural members to be braced. In FIGS. 1 and 4 this angle is 90°, where in FIGS. 3 and 5 this angle is greater than and less than 90°, respectively.

The outer surface of each anchor tabs forms with the outer surface of the adjacent lateral portion an included angle of less than 180°. The angles between anchor tabs and adjacent lateral portions preferably are made equal. In any event the anchor tabs having a common end edge 20 or 22, or a common point 36 or 38 of juncture at the same end of the intermediate line 10, are disposed with their inner surfaces in a common plane, for abutment against the plane surface of the associated structural member. Thus (FIG. 1), the inner surfaces of the tabs 28 and 32 are disposed in a common plane for abutment against the structural member 40, and the inner surfaces of the tabs 30 and 34 are disposed in a common plane for abutment against the structural member 42.

The anchor tab portions are provided with a plurality of openings 44 through which to receive nails 46, screws, bolts or other suitable fastening elements by which to secure the tabs to the abutting structural members.

In FIG. 1 the outer corner portions 28' and 32' of the tabs 28 and 32 are offset angularly inward, substantially 90° with respect to the adjacent tab portion. These corner portions are spaced apart a distance substantially equal to the corresponding dimension of the structural member 40, whereby to receive the latter between them. These spaced corner portions thus serve to define exactly the position of the structural member. One or more openings 44' in the corner portions receive the nails 46' or other fastening elements which thus are directed perpendicular to the other fastening elements 46 in the main tab portions.

It will be understood that the other anchor tabs 30 and 34 also may be provided with offset corner portions, if desired.

It is to be noted in FIGS. 1 and 2 that the single line 10 represents a single line of juncture of the lateral portions 24 and 26. If desired, a pair of laterally spaced lines of juncture may be provided, whereby the lateral portions are joined through an intermediate flat portion. If such a pair of laterally spaced lines of juncture are provided, it will be understood that the lines 12, 14 and 16, 18 of bending associated with the lateral portions will extend outward from the opposite ends of the line of juncture associated with the corresponding lateral portions. The single line of juncture illustrated is preferred, however, for its greater strength.

It is to be noted further in FIGS. 1 and 2 that the angular lines 12 and 14 of bending associated with the lateral portion 24 extend from the opposite ends of the line 10 of juncture to a common point 48 of juncture at the outer lateral sides 50 of the lateral portion, and that the lines 16 and 18 of bending associated with the other lateral portion 26 extend from the opposite ends of the line 10 of juncture to a common point 52 of juncture at the outer lateral side 54 of that lateral portion. If desired, these pairs of lines of bending may extend to separate, spaced points at the outer lateral sides of the associated lateral portions.

In FIGS. 1 and 2 the points 36, 38, 48 and 52 of juncture of the lines of bending are midway between the ends of the edges of the plate, and the anchor tabs are bent to provide the 90° angular relationship illustrated in FIG. 4. The line of juncture 10 of the lateral portions thus extends at an angle of 45° relative to the planes of the inner surfaces of the anchor tabs. If the common points 48 and 52 of juncture of bending at the side edges of the plate are moved closer to the bottom edge 22 of the plate, the 45° slope illustrated in FIG. 4 increases progressively. If the common point of juncture of the lines are moved closer to the top edge 20 of the plate, the 45° slope illustrated in FIG. 4 decreases progressively.

To provide a brace for joining structural members which define between them an included angle greater than 90° (FIG. 3), the anchor tabs are bent to provide the desired greater angle A, and the included angle between the lateral portions 24 and 26 is increased. Conversely, if the brace is to be provided for joining of structural members which define between them an included angle of less than 90° (FIG. 5), the anchor tabs are bent to provide the desired angle A and the included angle between the lateral portions is decreased.

The brace of the present invention may be utilized in a diversity of applications. For example, it may be utilized to join structural members of furniture and cabinetry, building framing members, industrial beam structures, and many others. If used to join metal structural members, the brace may be made of appropriate metal and welded, riveted, bolted or otherwise secured to the structural members.

The brace may be made by various techniques, such as the casting or stamping of metal, or the molding of synthetic plastic. In any event, it is capable of being produced by a one-step operation, thereby insuring maximum uniformity and minimum cost of production.

It will be apparent to those skilled in the art that various changes in size, shape and other details of the arrangement described hereinbefore may be made without departing from the spirit of this invention.

Having now described my invention and the manner in which it may be used, I claim:

1. A structural brace for joining a pair of structural members defining between them an included angle of less than 180°, comprising
   (a) a single, initially rectangular plate of structural material having lateral portions offset angularly along a line of juncture extending to the opposite end edges of the plate and defining between their inner surfaces an included angle of less than 180°, and
   (b) a pair of anchor tab portions on each lateral portion extending angularly outward therefrom along lines of juncture with the lateral portion extending from the opposite ends of said line of juncture of the lateral portions to a common point of juncture at the outer lateral side edge of the associated lateral portion intermediate the ends of said side edge,
   (c) each lateral portion and each tab portion thereby being of triangular shape,
   (d) the tab portions of each pair defining between planes of intersection of their inner surfaces an included angle of less than 180° corresponding to the angle between a pair of structural members to be braced.

2. The structural brace of claim 1 wherein at least one pair of tab portions having a common point of juncture at one end of said line of juncture of the lateral portions have outer triangular corner portions offset angularly inward and spaced apart a distance substantially equal to the corresponding dimension of an associated structural member.

References Cited

UNITED STATES PATENTS

| | | | |
|---|---|---|---|
| 637,542 | 11/1899 | Wilson | 248—300 X |
| 2,638,643 | 5/1953 | Olson | 248—300 X |
| 3,194,527 | 7/1965 | Gruss | 248—248 X |

FOREIGN PATENTS

| | | |
|---|---|---|
| 334,957 | 9/1930 | Great Britain. |

RAMON S. BRITTS, Primary Examiner

U.S. Cl. X.R.

248—248, 300